UNITED STATES PATENT OFFICE.

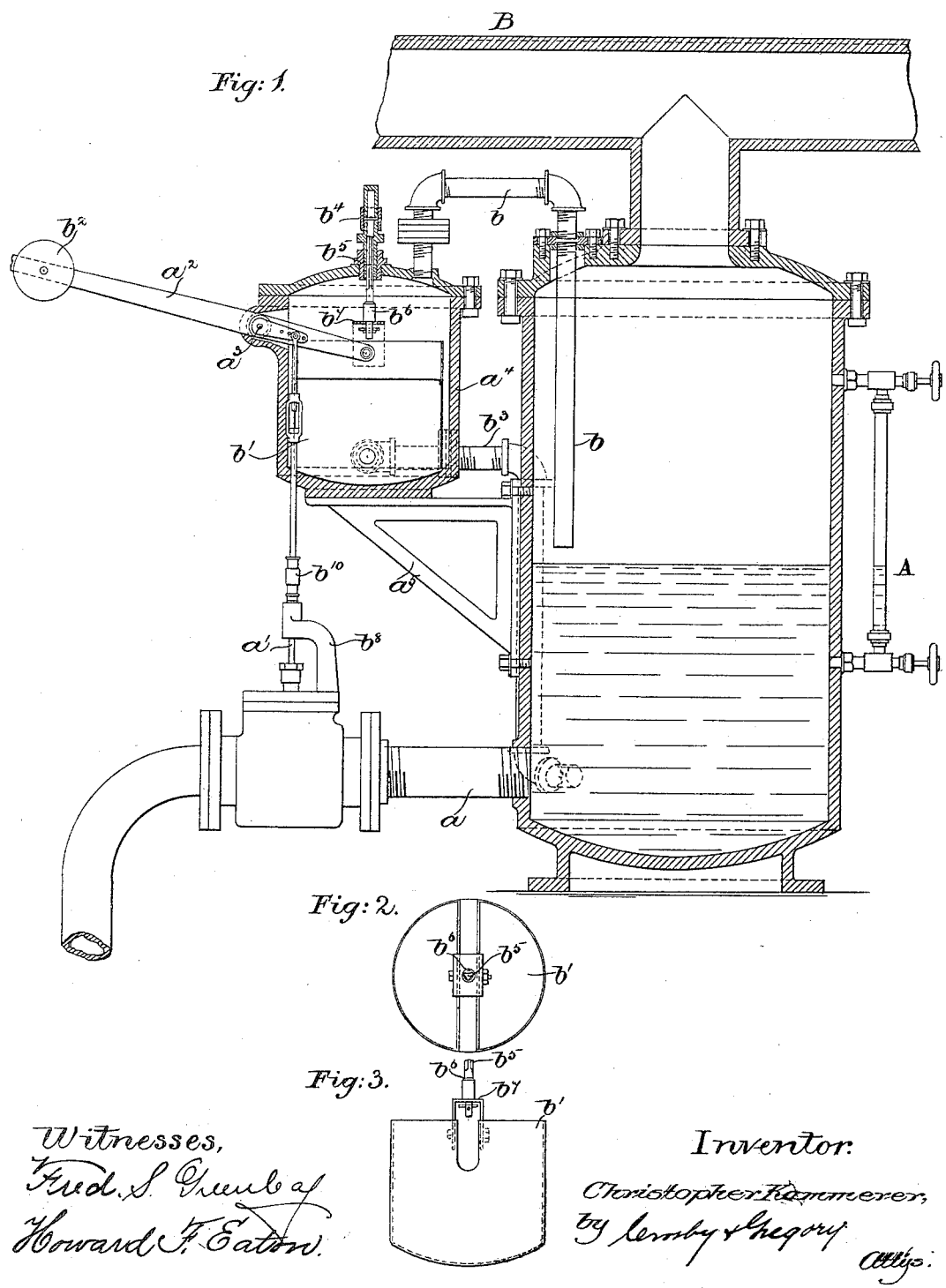

CHRISTOPHER KAMMERER, OF BOSTON, MASSACHUSETTS, ASSIGNOR TO JOSEPH F. STILLMAN, OF SAME PLACE.

STEAM-TRAP.

SPECIFICATION forming part of Letters Patent No. 398,622, dated February 26, 1889.

Application filed November 23, 1888. Serial No. 291,703. (No model.)

*To all whom it may concern:*

Be it known that I, CHRISTOPHER KAMMERER, of Boston, county of Suffolk, State of Massachusetts, have invented an Improvement in Steam-Traps, of which the following description, in connection with the accompanying drawings, is a specification, like letters on the drawings representing like parts.

This invention has for its object to provide a novel steam-trap constructed as will be described, whereby steam is prevented from escaping or leaking through the outlet-valve for the water of condensation accumulating in the trap, the said valve being governed automatically by the amount of water of condensation in the said trap.

Another feature of my invention consists in providing an outlet for air which may accumulate in said trap.

My invention in a steam-trap consists, essentially, in the combination, with a chamber or vessel provided with a steam-inlet and water-outlet and a valve to control said water-outlet, of an auxiliary chamber connected with the chamber or vessel, a float in said auxiliary chamber operatively connected to the said valve, and a counter-balance for said float, substantially as will be described.

Other features of my invention will be pointed out in the claims at the end of this specification.

Figure 1 shows, in section and elevation, a steam-trap embodying my invention; Figs. 2 and 3, details to be referred to.

The vessel or chamber A, provided with the water-outlet pipe $a$, having, preferably, a balanced valve, (not shown,) may be of any usual or well-known construction. The vessel or chamber A is connected, as herein shown, to the pipe B, which may be the bottom or lowest one of a series of steam-circulating coils or pipes, or it may be the condensation-pipe of a steam-chamber, (not shown,) the water of condensation from the pipe B flowing into the vessel or chamber A. The outlet-valve for the vessel A has its valve-stem $a'$ connected to one arm of lever $a^2$, pivoted, as at $a^3$, to an auxiliary chamber or vessel, $a^4$, herein shown as supported upon a bracket, $a^5$, attached to the chamber or vessel A.

The auxiliary vessel $a^4$ is provided with a cover secured steam-tight thereon in any usual or well-known manner, the said cover having connected to it one end of a pipe, $b$, having its other end extended down into the vessel A for substantially a considerable distance, for a purpose to be hereinafter described.

The auxiliary chamber $a^4$ contains within it a float, $b'$, preferably made as an open pot or vessel filled with liquid, the said float being connected in suitable manner to the lever $a^2$, having its other end provided with a suitable counterbalancing-weight, $b^2$. The float $b'$ is made of somewhat smaller area in cross-section than the auxiliary chamber to leave a water-space about the said float, the said space being connected to the vessel A near its bottom by a pipe, $b^3$.

The cover of the auxiliary chamber is provided with a steam-outlet pipe, $b^4$, into which is fitted the stem $b^5$ of a valve, $b^6$, carried by the float, it being connected, as shown, to a cross-bar, $b^7$, of the said float.

The valve-stem $a'$ of the water-outlet valve is extended through a guide herein shown as an arm or bracket, $b^8$, and the upper end of the said valve-stem is connected to the lever $a^2$, the said valve-stem being preferably provided with a flexible joint of any usual construction, as at $b^{10}$, so that when the lever is turned on its pivot the said valve-stem may move in a vertical or straight path.

In the operation of my improved steam-trap the water of condensation flows from the pipe B into the vessel A and accumulates therein, the water-outlet valve being closed and the float being in the position shown. With the parts in the position referred to, any air which may be in the coils or steam-chamber, and which is forced down when the steam is turned on in the coils, will readily find its way through the pipe $b$ and out at $b^4$. The water-outlet valve remains closed as long as the water of condensation in the vessel A does not cover or seal the mouth of the pipe $b$. If the water of condensation should accumulate in the trap A so as to cover or seal the mouth of the pipe $b$, the water will be forced by the steam-pressure into the auxiliary chamber through the pipes $b$ $b^3$ and counterbalance the weight of the float, thus allowing the weight $b^2$ on the lever to turn the same on its pivot and raise the water-outlet valve from its seat, thereby permitting the escape of water from the trap or vessel A. As soon as the water in the trap or vessel A falls below or unseals the mouth of the pipe $b$ the steam rushes into the vessel A and forces the water in the auxiliary chamber back into the trap A, and the float descends and closes the water-outlet valve, the air in the trap A, which settles and forms a layer between the steam and water, passing into the auxiliary chamber through the pipe $b$ and escaping therefrom through the outlet-pipe $b^4$, the latter being closed by the valve $b^6$ when the float is raised. It will thus be seen that a considerable body of water is maintained in the vessel A, which prevents the leaking or escape of the steam through the water-outlet valve, and also that an outlet for the air in the steam-trap is afforded through the pipe $b^4$.

I claim—

1. In a steam-trap, the combination, with a chamber or vessel, A, provided with a steam-inlet and water-outlet and a valve to control said water-outlet, of an auxiliary chamber connected with the chamber or vessel A, a float in said auxiliary chamber operatively connected to the said valve, and a counter-balance for said float, substantially as described.

2. In a steam-trap, the combination, with a chamber or vessel, A, provided with a steam-inlet and water-outlet and a valve to control said water-outlet, of an auxiliary chamber connected with the chamber or vessel A, a float in said auxiliary chamber operatively connected to the said valve, an air-outlet in the auxiliary chamber, a valve for said outlet carried by the float, and a counter-balance for said float, substantially as described.

In testimony whereof I have signed my name to this specification in the presence of two subscribing witnesses.

CHRISTOPHER KAMMERER.

Witnesses:
JAS. H. CHURCHILL,
A. S. WIEGAND.